United States Patent [19]

Zorzi et al.

[11] 4,201,703

[45] May 6, 1980

[54] POLYPIVALOLACTONE-POLYCARBONATE BLENDS

[75] Inventors: Paul A. Zorzi; Jesse D. Jones; Michael E. Kucsma, all of Baton Rouge, La.

[73] Assignee: Ethyl Corporation, Richmond, Va.

[21] Appl. No.: 913,877

[22] Filed: Jun. 8, 1978

[51] Int. Cl.$^2$ .............................................. C08L 67/00
[52] U.S. Cl. ............................ 260/37 PC; 260/40 R; 260/45.7 P; 260/DIG. 21; 525/426
[58] Field of Search ................ 260/37 PC, 40 R, 860

[56] References Cited

U.S. PATENT DOCUMENTS

| | | | |
|---|---|---|---|
| 3,563,847 | 2/1971 | Rye et al. | 260/860 X |
| 3,752,866 | 8/1973 | Doerr | 260/860 |
| 4,089,838 | 5/1978 | Hornbaker et al. | 260/40 R |

*Primary Examiner*—Richard B. Turer
*Attorney, Agent, or Firm*—Donald L. Johnson; John F. Sieberth; Frederick A. Stolzle, Jr.

[57] ABSTRACT

Intimate blends of polypivalolactone resin and polycarbonate resin enable the production of molded articles exhibiting low warpage properties.

7 Claims, No Drawings

POLYPIVALOLACTONE-POLYCARBONATE BLENDS

BACKGROUND

Polypivalolactone is a well known thermoplastic material. Methods for its synthesis are described, for example, in U.S. Pat. Nos. 3,268,486, 3,471,456, 3,669,940 and 3,773,726 which patents are incorporated herein by reference. Applications for polypivalolactone include its use in making films (e.g., U.S. Pat. No. 3,476,714) and in making molded articles where high compressive strength, hardness, and high heat resistance are desirable. Mayne, in a paper entitled "The Polymerization of Polypivalolactone", published in *Chemtech* (December, 1972) points out the usefulness of polypivalolactone as an engineering thermoplastic because of its high heat resistance.

Notwithstanding the many desirable qualities of polypivalolactone (PPL), a problem associated with structural articles molded from PPL is their tendency to warp to an excessive extent. This problem occurs in articles molded by various methods known to the art, e.g., injection molding, compression molding, extrusion molding, blow molding, etc., and is especially troublesome when parts are molded with certain geometries (e.g., large, thin, rigid sections) and in configurations where uniformity and/or close tolerances are required. For these applications, low warpage in the finished part is a prime requisite.

THE INVENTION

It has now been found that certain intimate physical blends of polycarbonate resin with polypivalolactone resin yield resins that can be molded, using methods known in the art, to produce articles having low warpage properties. The physical blends of the present invention comprise mixtures of from about 60 wt. % to about 90 wt. % polypivalolactone with from about 40 wt. % to about 10 wt. % polycarbonate. The blends may optionally contain a reinforcing amount of a reinforcing filler. Generally, fiber fillers (e.g. fiberglass) and particulate fillers (e.g., alumina, silica, mullite, graphite, calcium magnesium aluminosilicate) are used in an amount up to about 100% by weight based on the total weight of the resinous components of the blend. These fillers may be incorporated into the blends individually or in combination with other fillers herein described. Of these materials, calcium magnesium aluminosilicate is particularly preferred because of its availability and low cost.

The blends may also contain from about 10 to about 20 wt. % of the total weight of the resinous blend of a flame retardant. Typically ammonium polyphosphate and optionally in combination, a polybrominated aromatic compound such as decabromodiphenyl oxide or bis(dimethoxyphosphenyl) tetrabromo-p-xylene may be used.

A preferred embodiment of this invention involves a blend of from about 70 to about 85 wt. % of a polypivalolactone resin having an LVN as measured in benzyl alcohol at 150° C. of from about 1.0 to about 1.6, and from about 30 to about 15 wt. % of a polycarbonate resin. As in all of the blends of this invention, this composition may be furnished as an unreinforced blend or it may be reinforced with a suitable filler such as a calcium magnesium aluminosilicate. These and other embodiments of the invention will be apparent from the ensuing description and appended claims.

The thermoplastic polypivalolactone resin used in the present invention is a linear condensation polymer consisting substantially of recurring ester structure units of the formula:

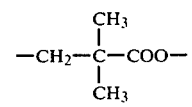

Such resins can be produced by known methods such as by polymerizing hydroxypivalic acid or its esters as described in the patents and paper of Mayne cited above.

It has been found that warpage of articles made from neat polypivalolactone varies with the Limiting Viscosity Number (LVN) of the particular polypivalolactone resin used in the formation of the article. Since warpage, for most applications, is a significant problem in higher molecular weight polypivalolactone resins, use of blends of the present invention is particularly desirable where the Limiting Viscosity Number (LVN) of the polypivalolactone is above about one. As is well known in the art—see for example Billmeyer, Textbook of Polymer Science, Interscience, New York, 1965, pages 79–81—LVN is a measure of polymer molecular weight.

The term "warpage" for purposes of the present invention is a measure of the deflection or distortion experienced in standard sized molded plastic articles. The amount of warpage that may be tolerated in the finished part involves consideration of the job to which the part is to be applied. For some structural or mechanical applications (e.g., automobile parts, such as distributor caps, and various mechanism parts such as timing gears) a complete lack of warpage is desirable, while other applications (e.g., television cabinets) may require less rigid warpage standards. Since for most applications PPL with an LVN above about 1.0 possesses physical properties which are usually more desirable than PPL with an LVN below about 1.0, the blends of this invention preferably contain PPL with higher molecular weight. Typically the PPL is one in which the LVN is from about 1.0 to about 2.5 as measured in benzyl alcohol at 150° C. However thermoplastic PPL resins with an LVN either above or below this range may be employed in the practice of this invention.

Thermoplastic aromatic polycarbonates which may be used in preparing the compositions of this invention are well known materials described in numerous patents and publications such as in U.S. Pat. Nos. 3,028,365, 3,144,432, 3,153,008 and 3,294,741. They are commonly prepared by direct reaction of phosgene with aromatic dihydroxy compounds such as Bisphenol A via interfacial phosgenation or solution phosgenation or by transesterification between an aromatic dihydroxy compound and carbonic acid esters. Polycarbonates are available as articles of commerce under various product names from a number of well-known producers. In order to enhance the flame retardancy of the polymeric blends it may be desirable to utilize chlorine and/or bromine substituted polycarbonates in forming the blends of the present invention. While aromatic polycarbonates having various degrees of polymerization may be used, it is preferred that their degrees of polymerization fall within the range corresponding to a melt flow of from about 4 to about 11 g/10min. as measured by the ASTM—D-1238 test (Condition O); particularly preferred are aromatic polycarbonate resins having a melt flow of from about 6 to about 9 g/10 min.

The polycarbonates used in this invention may be obtained either as pellets or as a powder. Methods for producing pellets and powder are also well known in the art and are described in *Polycarbonates* by Christopher and Fox, published in 1962 by Reinhold Printing Corporation of New York.

In forming the blends of the present invention it is preferred to form melt-blends which result in intimate mixtures of the polymer components. They can be prepared by any of the procedures ordinarily used to mix or compound other conventional polymeric masses. For example, the two resin batches can be mixed or blended together in a ribbon blender, a differential-speed roll mill, a Hobart mixer, a paddle blender, or the like. When hot processing techniques are employed, it is advantageous to conduct at least a portion of the mixing at temperatures high enough, e.g., above about 230° C., to flux the resin mass in order to achieve the maximum uniformity of product.

In order to more fully illustrate the present invention, reference is made to the following examples.

EXAMPLE I

A blend was prepared by mechanically mixing polycarbonate (PC) and polypivalolactone (PPL) resins and processing the mixture on an injection molding machine into parts suitable for grinding into pellets. Test specimens were injection molded from spherical pellets ranging from approximately ⅛" to 5/15" in diameter. All test specimens, including the control made from the neat PPL resin, were produced using a New Britain reciprocating screw injection molding machine in which the mold temperature was maintained at about 165° F. The barrel temperatures in the machine were set at about 480° F. and the machine was operated semi-automatically with a screw back pressure of about 100 psig, a mold cycle time of about 30 seconds and an injection time of about 1.0 to 1.5 seconds. The initial several specimens of each composition were discarded and only those specimens made after the machine had equilibrated were tested.

Table I shows the warpage of molded specimens of neat PPL and warpage of molded specimens of a blend of the invention. The specimens, plaques 9 inches by 9 inches by 1/16 of an inch, were allowed to set at room temperature for 24 hours and were then placed on a flat surface where three sides were secured by C-clamps, thus permitting the fourth side freedom to buckle. For each plaque three sides were measured and the average distance in mm. between the flat surface and the part of the plaque farthest away from the flat surface is the warpage listed in the table.

TABLE I

Warpage of a PPL-PC Blend and of Neat PPL

| Composition | Warpage (mm) |
| --- | --- |
| Blend - 80% PPL[1] + 20% PC[2] | 14.3 |
| Resin - 100% PPL[1] | 25.4 |

[1]LVN 1.4 as measured in benzyl alcohol at 150° C.; stabilized with 0.05 wt. % dicetylsulfide.
[2]Poly[2,2-propane-bis(4-phenyl carbonate)]; Mobay MPG 750; Melt flow 6-9 g/10 min. as mesured by the ASTM-D-1238 test (condition O); melting point 218°-227° C.

EXAMPLE II

In this instance the warpage tendencies of molded parts made from reinforced resins were measured. The resin compositions were prepared by first dispersing the coupling agent and reinforcing filler in a mixer. The mixer was then "cured" and volatile substances removed by heating the mixture in a circulating hot air oven at 95° C. for two hours. The "cured" mixture was then blended with the other ingredients and test specimens of appropriate size and configuration were molded in the same fashion as described in Example I. Test specimens were produced at a mold temperature of 190° F. unless otherwise noted.

Physical and mechanical properties summarized in Table II were determined in accordance with ASTM procedures where applicable: tensile strength—D-638; tensile elastic modulus—D-638; flexural strength—D-790; flexural elastic modulus—D-790; Izod impact—D-256; heat distortion temperature—D-648; tensile impact—D-1822; specific gravity—D-792; tensile yield—D-638; mold shrinkage—D-1299. The spiral flow values were obtained by injection molding the compositions at about 480° F. into a coiled spiral mold 25 inches from head to tail which is kept at about 190° F. The penetration in inches of the hot polymer composition into the cooler mold is termed the "spiral flow". The values for warpage were determined in the same manner as in Example I.

TABLE II

Property Comparison of Polypivalolactone Formulations

|  | Blend of this Invention | Comparative Blend |
| --- | --- | --- |
| Formulation (%) | | |
| Polypivalolactone[1] | 47.60 | 59.50 |
| Polycarbonate[1] | 11.90 | — |
| Reinforcing Agent[2] | 39.62 | 39.62 |
| Coupling Agent[3] | 0.52 | 0.52 |
| Antioxidant[4] | 0.06 | 0.06 |
| TiO$_2$ | 0.30 | 0.30 |
| Properties | | |
| Specific Gravity | 1.538 | 1.520 |
| Tensile-Yield (psi) | 9070 | 8660 |
| Tensile-Yield at 150° C. (psi) | 3640 | 3820 |
| Flexural Strength (psi) | 16,900 | 16,900 |
| Flexural Strength at 150° C. (psi) | 8410 | 7770 |
| Flexural Elastic Modulus (psi) | 829,000 | 822,000 |
| Flexural Elastic Modulus at 150° C. (psi) | 331,000 | 263,000 |
| Izod Impact, ⅛" bar (ft. - lb./in.) | 1.0 | 1.10 |
| Heat Distortion Temp. (at 264 psi, °C.) | 205 | 208 |
| Spiral Flow (inches) | 16.0 | 22.0 |
| Mold Shrinkage, in./in. | | |
| Length Dimension | 0.005 | 0.006 |
| Thickness | 0.010 | 0.010 |
| Warpage, mm (measured on 9" × 9" × .060" plaque) | 0.3 | 2.5 / 4.7* |

*165° F. Mold Temperature
[1]Same as Example I.
[2]Calcium magnesium aluminosilicate; processed mineral fiber, Jim Walter Resources, Inc.
[3]A-187, γ-glycidoxypropyltrimethoxysilane, a product of Union Carbide Corporation.
[4]1,3,5-Trimethyl-2,4,6-tris(3,5-di-tert-butyl-4-hydroxybenzyl)benzene; a product of Ethyl Corporation.

As illustrated in Example II, preferred blends of this invention contain a reinforcing amount of a reinforcing filler. Although the quantity of filler incorporated into these blends involves, among other factors, consideration of the physical properties desired of the composition, the quantity generally ranges up to about 100% by weight based on the total weight of the resinous components of the blend. In the most preferred embodiments, the blends contain from about 10 wt. % to about 100 wt. % of reinforcing filler based on the total weight of the resins of the blend. Examples of suitable fillers which may be used in the practice of this invention include such materials as fiberglass, alumina, silica, mullite, graphite, wollastonite, mica, asbestos (such as amosite, chrysotile or crocidolite) and other metal silicates, phosphates, aluminates, aluminosilicates, sulfates, sulfides, carbides, etc.; other inorganic compounds such as potassium titanate, sodium aluminum carbonate, boron carbide, silicon carbide, silicon nitride and tungsten boride; and amorphous materials such as calcium magnesium aluminosilicate.

It is also desirable that coupling agents be included in the resinous blends when a reinforcing filler is used in order to enhance the attraction between the filler and the polymers constituting the blends. Such coupling agents are described in U.S. Pat. No. 4,089,838, which is incorporated herein as if fully set forth. Examples of desirable coupling agents are γ-aminoalkyltrialkoxysilane,
(e.g., γ-aminopropyltriethoxysilane),
γ-glycidoxyalkyltrialkoxysilane,
(e.g., γ-glycidoxypropyltrimethoxysilane),
N-β-(aminoethyl)-γ-aminoalkyltrialkoxysilane
(e.g., N-β-(aminoethyl)-γ-aminopropyltrimethoxysilane).

When incorporated into the blends of the present invention it is desirable that the coupling agent be present in an amount of from about 0.01 wt. % to about 1.0 wt. % based on the total weight of the resinous components of the blend. Preferably the coupling agent is present in the amount of from about 0.25 wt. % to about 0.75 wt. %.

In another preferred embodiment the resinous blends of the present invention may also contain flame retardants. While many varieties of organic and inorganic flame retardants are known for use in thermoplastic resins, it is preferred that ammonium polyphosphate and optionally a polybrominated aromatic compound and a synergist be used in the practice of this invention. Ammonium polyphosphate is a desirable flame retardant because of its effectiveness in enhancing the flame resistancy of polypivalolactone and blends thereof without adversely affecting desirable properties such as for example color, hardness and high heat resistance. The amount of ammonium polyphosphate incorporated into the resinous blends of the present invention will usually involve consideration of the amount of flame resistancy desired. Generally, ammonium polyphosphate comprising up to 45 wt. % of the total weight of the resinous components of the blend provides adequate flame resistancy. In the most preferred embodiments the blends of the present invention can contain from about 10 to about 20 wt. % of ammonium polyphosphate based on the total weight of the resinous components of the blend. U.S. Pat. No. 4,145,330, the disclosure of which is incorporated herein describes in detail the use of such preferred flame retardants in PPL.

In addition to ammonium polyphosphate, other flame retardant materials may be incorporated into the compositions of this invention. The incorporation of certain polybrominated aromatic compounds into these compositions is particularly desirable. Exemplary materials include pentabromotoluene, tetrabromophthalic anhydride, tetrabromophthalic acid, 3,5,3',5'-tetrabromobiphenyl ether, 2,2', 4,4',6,6'-hexabromobiphenyl, 2,2-bis(3,3',5,5'-tetrabromo-4-4'-dihydroxyphenyl) propane, and bis(pentabromophenoxy)butane. Preferred polybrominated aromatics are decabromodiphenyl oxide, and bis(dimethoxyphosphinyl)tetrabromo-p-xylene. When incorporated into the blends of the present invention it is desirable that the amount of polybrominated aromatic flame retardant range up to about 5 wt. % (preferably from about 2 to about 4 wt. %) based on the total weight of the resinous components of the blend.

Synergists or compounds which enhance the effectiveness of the flame retardants used in the blends of the present invention may also be incorporated into the blends of the present invention. Such metal compounds as salts and oxides of antimony, arsenic, bismuth, molybdenum, tin, tungsten, zinc, etc., are useful as synergists. The preferred synergists are the oxides and salts of antimony. When incorporated into the blends of the present invention it is desirable that the synergist be present in the amount of up to about 5 wt. % of the total weight of the resinous components of the blend.

Other ingredients may also be incorporated into the blends of the present invention in accordance with the particular function to be served by the blend. By way of example, a nucleating agent may be used in the blends to provide maximum toughness. See U.S. Pat. No. 3,471,455. Likewise, impact modifiers may be utilized, including such materials as methacrylated butadienestyrene polymers (see U.S. Pat. Nos. 2,857,360 and 2,943,074), blends of polymethylmethacrylate and graft copolymer resins (see U.S. Pat. No. 3,170,964), ethylene-vinyl acetate copolymers, ethylene-arcylate copolymers, and other commercially available MBS or acrylic types.

Other ingredients which may be incorporated into the blends of this invention are antioxidants, colorants, pigmenting agents, heat stabilizers, lubricants, light stabilizers, plasticizers, mold release agents, processing aids, etc. Examples of suitable antioxidants are 1,3,5,-trimethyl-2,4,6-tris(3,5-di-tert-butyl-4-hydroxybenzyl) benzene, 4,4'-methylene-bis(2,6-di-tert-butylphenol); and N-phenyl-β-naphthalene. Desirable amounts of antioxidant, for purposes of the present invention, range from about 0.01 wt. % to about 2 wt. % based on the total weight of the resinous components of the blend. Of the various, colorants or pigmenting agents which may be incorporated in the compositions of the present invention, it is generally desirable to employ titanium dioxide, particularly in an amount of from about 0.01 wt. % to about 1 wt. %. Examples of suitable heat stabilizers are tri-(nonylphenyl)phosphite, and dihydrocarbyl sulfides such as didecylmono- and disulfide, dioctadecylmono- and disulfide, and dicetyl sulfide. See U.S. Pat. No. 3,632,552.

Blends of the present invention may be used for molding electrical or electronic components, e.g., plug connections, hair dryer parts, flexible printing circuit, TV parts, etc., and mechanical components, e.g., motor covers, automobile components, medicine containers, etc.

Other modifications and variations of the present invention will now be readily apparent in light of the above teachings. It is therefore to be understood that changes may be made in the particular embodiments described above which are within the spirit and intended scope of the invention as defined in the appended claims.

What is claimed is:

1. A moldable thermoplastic resin composition having low warpage properties when molded comprising an intimate blend of from about 60 to about 90 weight percent of a polypivalolactone resin and from about 40 to about 10 weight percent of a thermoplastic aromatic polycarbonate resin.

2. A composition in accordance with claim 1 wherein the polycarbonate has a melt flow of from 4 to 11 as measured by the ASTM—D-1238 test at Condition O.

3. A composition in accordance with claim 1 wherein the polycarbonate has a melt flow of from 6 to 9 as measured by the ASTM—D-1238 test at Condition O.

4. A composition in accordance with claim 1 including a reinforcing amount of reinforcing filler.

5. A composition in accordance with claim 4 wherein the reinforcing filler is calcium magnesium aluminosilicate.

6. A composition in accordance with claim 1 in which said blend is composed of (a) from about 70 to about 85 weight percent of a polypivalolactone resin having an LVN as measured in benzyl alcohol at 150° C. of from about 1.0 to about 1.6 and (b) from about 30 to about 15 weight percent of the polycarbonate resin.

7. A composition in accordance with claim 5 wherein said blend contains calcium magnesium aluminosilicate reinforcing filler in an amount of up to about 100 percent by weight based on the total weight of the resinous components of said blend.

* * * * *